(12) United States Patent
Belz et al.

(10) Patent No.: US 8,260,858 B2
(45) Date of Patent: Sep. 4, 2012

(54) HOSTING MASSIVELY MULTIPLAYER ONLINE GAMING VIA MOBILE DEVICES

(75) Inventors: Steven Belz, Cedar Park, TX (US);
James Pratt, Round Rock, TX (US);
Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 547 days.

(21) Appl. No.: 12/266,220

(22) Filed: Nov. 6, 2008

(65) Prior Publication Data
US 2010/0113160 A1    May 6, 2010

(51) Int. Cl.
*G06F 15/16* (2006.01)
*G06F 15/173* (2006.01)
*G06F 15/177* (2006.01)

(52) U.S. Cl. ............... 709/205; 463/40; 463/42; 482/8; 726/3

(58) Field of Classification Search .................. 709/205, 709/203, 217–228; 463/40, 42; 726/3; 482/8
See application file for complete search history.

(56) References Cited

U.S. PATENT DOCUMENTS

| | | | | |
|---|---|---|---|---|
| 2009/0017913 A1* | 1/2009 | Bell et al. | ........................ | 463/40 |
| 2009/0165090 A1* | 6/2009 | Glasgow | ............................ | 726/3 |
| 2009/0227374 A1* | 9/2009 | Tirpak et al. | .................... | 463/40 |
| 2010/0041481 A1* | 2/2010 | Smedley et al. | ................ | 463/42 |
| 2010/0331146 A1* | 12/2010 | Kil | .................................. | 482/8 |

* cited by examiner

*Primary Examiner* — Haresh N Patel
(74) *Attorney, Agent, or Firm* — Turocy & Watson, LLP

(57) ABSTRACT

Systems and methods of organizing a massively multiplayer online game (MMOG) via mobile units are provided. Features of mobile units such as messaging and location based services are incorporated into the game to enhance the user experience. The MMOG provides social networking opportunities to players by associating players based on similarities such as shared interests and activities. These shared interests and activities can be determined based on associations of the players in other situations, such as disparate online games or websites. In addition, advertising content can be provided to players based on similar factors. In an example implementation, the MMOG comprises a game similar to the offline game of tag, wherein players can "tag" each other through in-game interactions via the mobile units. These interactions can be triggered based on players being a fixed predetermined distance from each other.

16 Claims, 16 Drawing Sheets

HOSTING MASSIVELY MULTIPLAYER ONLINE GAMING VIA MOBILE DEVICES

TECHNICAL FIELD

The subject innovation relates to wireless communication and, more particularly, to massively multiplayer online gaming and social networking via handheld mobile devices.

BACKGROUND

Recently, the capabilities of handheld mobile devices have increased in a number of ways. Increased memory, processing power, and input and output interfaces have allowed mobile units to utilize more sophisticated applications than were previously possible. In addition, more recent mobile units are equipped with features not previously available on mobile units, such as improved messaging capabilities (including multimedia messaging) and location-based services.

As mobile devices have improved, more sophisticated games have been developed for mobile devices. These games often take advantage of the increased computing capabilities of modern mobile devices, as well as improved display capabilities. Many games are derived from games that are popular on other systems, such as home consoles or personal computers. Examples of such games are massively multiplayer online games (MMOGs) like Fighter Ace®, World of Warcraft®, Tales of Pirates®, and so forth. However, many of the features unique to mobile devices have been largely overlooked in developing games, particularly MMOGs.

In addition, social interaction within MMOGs and otherwise has largely benefitted from technology advances. For example, Internet social networking sites and MMOGs and other online games provide subscribers or players with opportunities for meeting new individuals and fostering socialization. Users frequently desire to stay in touch with online acquaintances such as other players even when not near a computer. Yet, users are often unaware when friends or acquaintances are nearby, thus missing opportunities for social interaction which otherwise might have been taken advantage of.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation facilitates organizing a massively multiplayer online game played over mobile units. Mobile units can interact with one another over a game system. Features of the mobile units can be enabled to work in conjunction with the game, such as messaging, chat, and location-based services. In one embodiment, users can play a game similar to tag where points can be scored by "tagging" other players via mobile unit interactions.

The subject innovation also provides for interfacing with social networking sites, organizations, or other online games. Acquaintances known by a user over any of those can be associated with the user so that they can interact in the game of the present innovation.

In another aspect thereof, the game can be provided to users in conjunction with advertising. The advertising can be targeted to users of the game, and customized based on a variety of factors. Those factors can include location of the user, interests of the user, and interests of other users that the user interacts with in the game.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
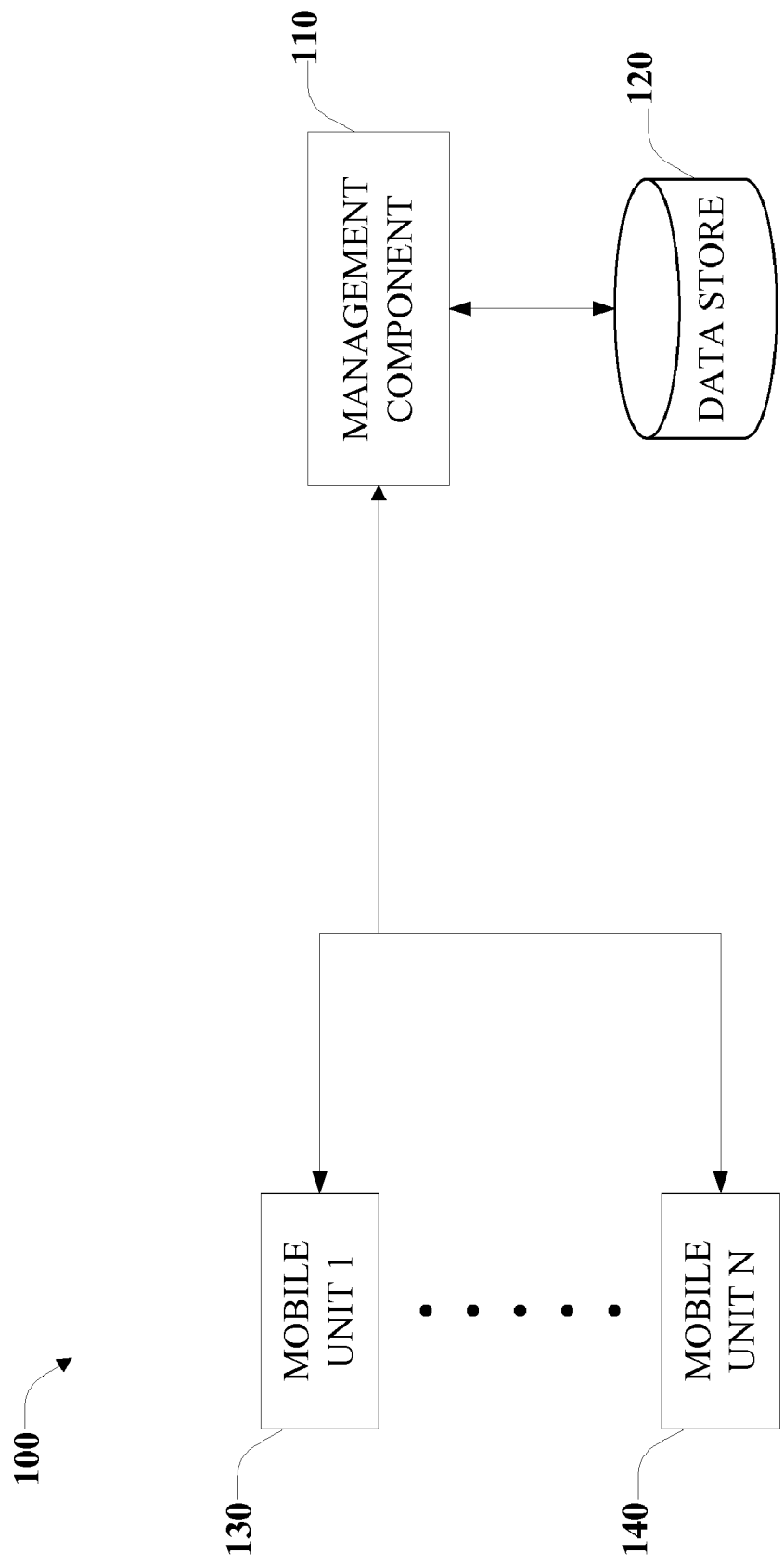
FIG. 1 illustrates an example system that facilitates organizing a massively multiplayer online game (MMOG) played over mobile units in accordance with the disclosed subject matter.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "mobile unit," "subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Furthermore, the terms "user," "subscriber," "player," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

Referring to the drawings, FIG. 1 illustrates an example system 100 that facilitates organizing a massively multiplayer online game (MMOG) played over mobile units in accordance with the disclosed subject matter. A MMOG differs from other multiplayer video games in that potentially hundreds or thousands of users can play together in the same MMOG. Example system 100 can include a management component 110 that coordinates data necessary for the game. Management component 110 is functionally coupled to data store 120, which stores information related to the game. This information can include data related to the players, such as aliases, location data, scores and other statistics associated with the players, etc. This information can also include data associated with the game, such as program(s) necessary to run the game, optional information associated with the game, etc. For example, in a tag embodiment as discussed below, this information can include one or programs used by management component 110 to manage the game, locations and aliases of players, optional game information such as particular rules (e.g., the distance at which players can be tagged by one another), statistics such as how often players have tagged one another, etc. Mobile unit 1 130 through mobile unit N 140 (N is a positive integer) can exchange information associated with the game, with each other, and with management component 110. It should be appreciated that system 100 can comprise a substantially arbitrary number of mobile units.

Although for the purpose of illustration, data store 120 is depicted as a single storage element (e.g., a memory), data store 120 also can be implemented as multiple storage devices. Additionally, although management component 110 and data store 120 are depicted as separate from mobile units 1 130 through N 140, in alternate or additional embodiments, management component 110, data store 120, or both can reside within a mobile unit or be distributed across two or more mobile units. It should be appreciated that example system 100 can be readily implemented in a peer-to-peer manner whereby a centralized server or servers are not required.

In addition to information related to the game, data store 120 can also include information associated with mobile units 1 130 through N 140. Examples of retained information include player account or subscription information such as login and password settings, user preferences, user ratings, game or player account options, etc. Also, data store 120 can include information related to previous games and other games in progress, such as user rankings, players participating in games, and scores associated with those players. In such cases, management component 110 can be connected to the Internet (not shown) such that rankings and games in progress can be monitored via any device capable of connecting to the Internet.

Subscribers can interact with each other and with management component 110 by means of mobile units 1 130 through N 140. Available interactions can depend on the particular game and embodiment, as discussed further below. Additionally, features such as location capabilities (e.g., global positioning system (GPS) receiver(s)), Internet browser applications, etc. available on mobile units 1 130 through N 140 can be used in connection with system 100. Example system 100 can interact with existing network architecture (not shown) to provide additional or different functionalities for features such as voice calling, text messaging via short message service (SMS), multimedia messaging via multimedia message service (MMS), chat, and location-based services (LBS), when used in connection with the game. As illustrative examples, players can call or message other subscribers based on in-game aliases instead of phone numbers, players can receive SMS notifications when certain other players join/leave the game or are within a certain distance, players can leave messages (voice, SMS, MMS, etc.) for one or more other players which can be triggered based on in-game conditions being met, etc.

With respect to subscriber interaction, for example, a group of mobile users that participate in online games can desire to play and communicate with other users while retaining a level of anonymity. System 100 can facilitate these goals by associating voice, messaging, and chat related to the game with a unique identifier such as an account name or user alias instead of a mobile number. Moreover, special voice or chat channels or messaging groups (for example, to send a message to a set of users) can be created and associated with the game. As an example, in a team-based game, users may want to be able to communicate simultaneously with all other users on the same team, and a channel or group could be associated with each team. In another example, groups of players can desire to associate together (e.g., into a "clan" or "guild," as the terms are used in the context of online games) and have an associated channel or group.

Location-based services associated with mobile units 1 130 through N 140 can also provide additional functions when used in connection with system 100. The locations of mobile units 1 130 through N 140 can be determined by any known method or combination of methods, e.g. cell triangulation, GPS, Bluetooth™ triangulation, etc. Depending on the game, the mobile unit location of a first user who chooses to participate in the game can be communicated to a group of other users. This group could comprise all other users, or could include other users based on one or more factors, including whether the first user or the other user is a member of a given team or group; the distance between the first user and a second user; whether the two users have had a given interaction, or had an interaction within a certain time period; the preferences of either or both of the users; etc. Additionally, if a player's location is displayed only to other players within a certain distance, that distance could depend on whether or how fast the player is moving (analogous to hiding or sneaking), based on how the player's mobile unit location changes with time, or via other known techniques.

Certain aspects of the game can change based on the location information of mobile units 1 130 through N 140, e.g., when a mobile unit is near a particular location or another mobile unit. For example, some actions and interactions could be available only when close to a mobile unit or particular location. In another example, a user could send a message to all players in the game who are within some given distance of the user.

Other aspects of the game can change in various embodiments depending on the user demographics. For example, some users may prefer a more challenging or competitive game, while others may prefer an environment that focuses more on social interaction and the ability to communicate with other users (e.g., to meet new people, share information, arrange meetings and gatherings, etc.).

In an aspect of the subject innovation, example system 100 can be used to facilitate a MMOG similar to the well-known offline game of tag. In classical offline tag, one player is designated "it" and must catch and physically tag one of the other players, who try to avoid being tagged. If the player who is "it" successfully tags another player, that other player becomes "it," and the player who was previously "it" must now avoid being tagged.

In a tag embodiment of the subject innovation, aspects of the classical offline tag game can be modified to adapt to the differences between offline tag (which is normally played in a fixed area, e.g. a playground) and mobile phone use, which need not be constrained to fixed geographic boundaries other than those imposed by service coverage associated with the mobile phone. Instead of having a single player ("it") that can tag all other players, each user can have a first group of players that the user can tag, and a second group of users that can tag the user, where the second group can be the same or different from the first group. As a non-exhaustive list of examples, a user could tag or be tagged by all players, users can be organized into groups or teams and only tag or be tagged by players on a different team, or players in the first and second group can be determined based on other factors, such as similarity of interests, activities, or organizations, as discussed infra.

In addition, "tagging" could be implemented in a different way than in offline tag. For example, when a user is within some predetermined distance from a player the user can tag, an option can be enabled on the user's mobile unit whereby the user can attempt to "tag" the other player. In one or more embodiments, the other player being tagged can avoid being tagged by responding to the tag attempt within a certain time period (set, e.g., by predetermined rules associated with the management component, by agreement of the players, etc.). Optionally, either or both of attempting to tag and avoiding being tagged can require coordination or timing as a condition of success.

Tagging another player can be coupled with other mobile unit features. For example, users could set messages that can be sent to players they interact with in the game, such as a message that is sent to a player upon successfully tagging the player, such as the score of the user, or a personalized message set by the user. In some embodiments, messages sent to a player could be sent to other players as they interact with them later in the game.

Although a tag embodiment was described above for nonlimiting illustration purposes, the subject innovation can be implemented in connection with a multitude of games, e.g., hide and seek, capture the flag, scavenger hunts, or substantially any similar games, wherein players must perform certain actions at locations, etc. Players can associate data with locations or objects in any of these embodiments, including the tag embodiment, such that other players who meet preconditions (e.g., belonging to a given group of players, being within a given distance of the location or object, performing certain interactions via their mobile units, etc.) will receive the associated data.

Moreover, though system 100 has been described above in the context of gaming, it can be used for additional or alternate purposes. In one embodiment, early responders to an emergency situation can use a feature such as the "tag" feature with messaging described above to associate information related to the emergency with persons and locations. This information could be used in a variety of ways, e.g. by automatically sending the information to other emergency responders, to provide triage information relating to injured persons, to provide directions to injured persons, etc. Using LBS and data accessible by mobile units can provide advantages over traditional means of triage and assist in quickly locating and re-locating persons needing assistance, especially when not visible, and can also be used in conjunction with traditional means.

Figure 2:
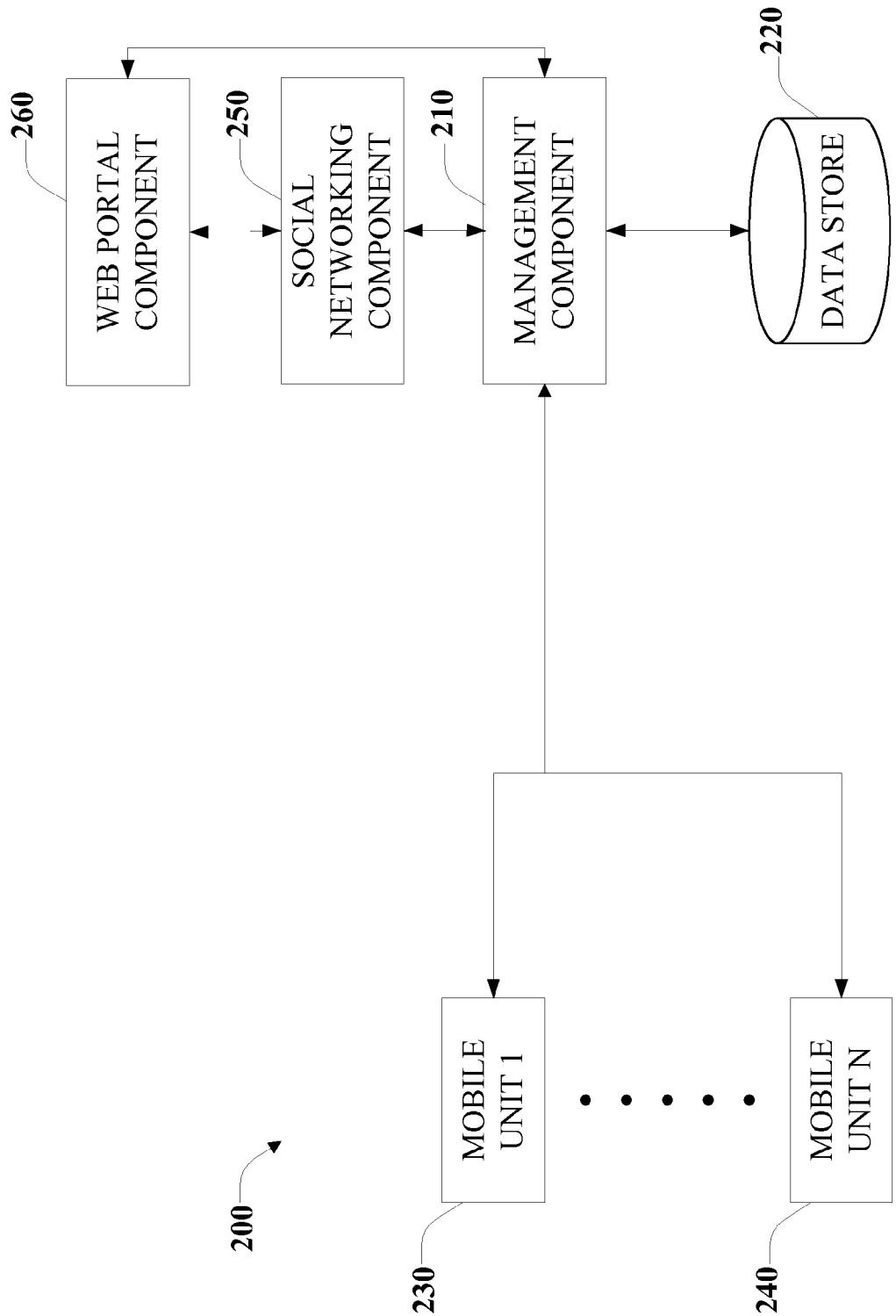
FIG. 2 illustrates an example system that facilitates a MMOG with social networking features in accordance with an aspect of the subject innovation.

Turning to FIG. 2, there is illustrated an example system 200 that facilitates a MMOG in accordance with another aspect of the subject innovation. In addition to components analogous to those already discussed, system 200 includes a social networking component 250 that can communicate to management component 210. Social networking component 250 obtains information related to interests and associations of mobile users. To that end, in an aspect, social network component 250 can collect user information at a time of registering a user to participate in a social networking enterprise (e.g., web-based publishing like blogging activities in a community oriented website; information dissemination through web hosting services; and so on) associated with social network component 250. As additional or alternative examples, information can be entered or modified by users via mobile units 230 and 240, information can be maintained or updated through ongoing monitoring of social networking enterprises, information can be inferred by social networking component 250 based on other information associated with users, etc. This information can be used to associate users based on similarities or connections between them. Users can be organized by management component 210 into groups based on the associations from social networking component 250. These similarities and connections can be based on information entered by users, e.g., about their interests, activities they participate in, organizations they belong to, etc.

System 200 can communicate with online games and social networking sites to draw similarities and connections between users. For example, if the subject innovation communicates with a different online game, players of the different online game can be associated by social networking component 250 on that basis. If people are friends on a social networking site, they can be associated on that basis. An online dating site could also be a basis for associations; players could interact with potential dating candidates. There are many other possible bases on which social networking component 250 can associate users. By way of example, these can include demographic data associated with players such as age, location, gender, etc.; preferences of players; offline associations, organizations, and interests of players; etc.

Example system 200 can also include web portal component 260, which can provide for monitoring of the MMOG via the Internet (not shown). Data associated with the MMOG can be exchanged between management component 210 and web portal component 260 to provide access to such data (e.g., scores, leaderboards, etc.). Web portal component 260 can provide access to game information to allow entities the opportunity to monitor progress in the MMOG even while not participating in the MMOG. For example, a subscriber desiring to modify account settings can communicate with web portal component via substantially any Internet connection. As such, any mobile device that can access a web page (including mobile units 230 through 240) can access web portal component 260 via the Internet (not shown).

Web portal component 260 can have additional capabilities in one or more aspects of the subject innovation. For example, web portal component 260 can interact with management component 210 to provide location and player information as real-time graphical content that displays gameplay progress of the MMOG. In one or more other aspects, social networking component 250 can be functionally coupled to web portal component 260 such that a subscriber can provide information to social networking component 250 via web portal component 260. For instance, the information can facilitate modifying interests and associations of the subscriber, managing a list of friends associated with the MMOG, managing a list of users the subscriber prefers to not interact with, etc.). Moreover, web portal component 260 can facilitate communication between users not currently playing the MMOG with players of the MMOG, for example, by providing messaging capabilities between the users not currently playing and the players.

Additionally, rewards in online games associated with system 200 can be triggered based on events connected to system 200.

Figure 3:
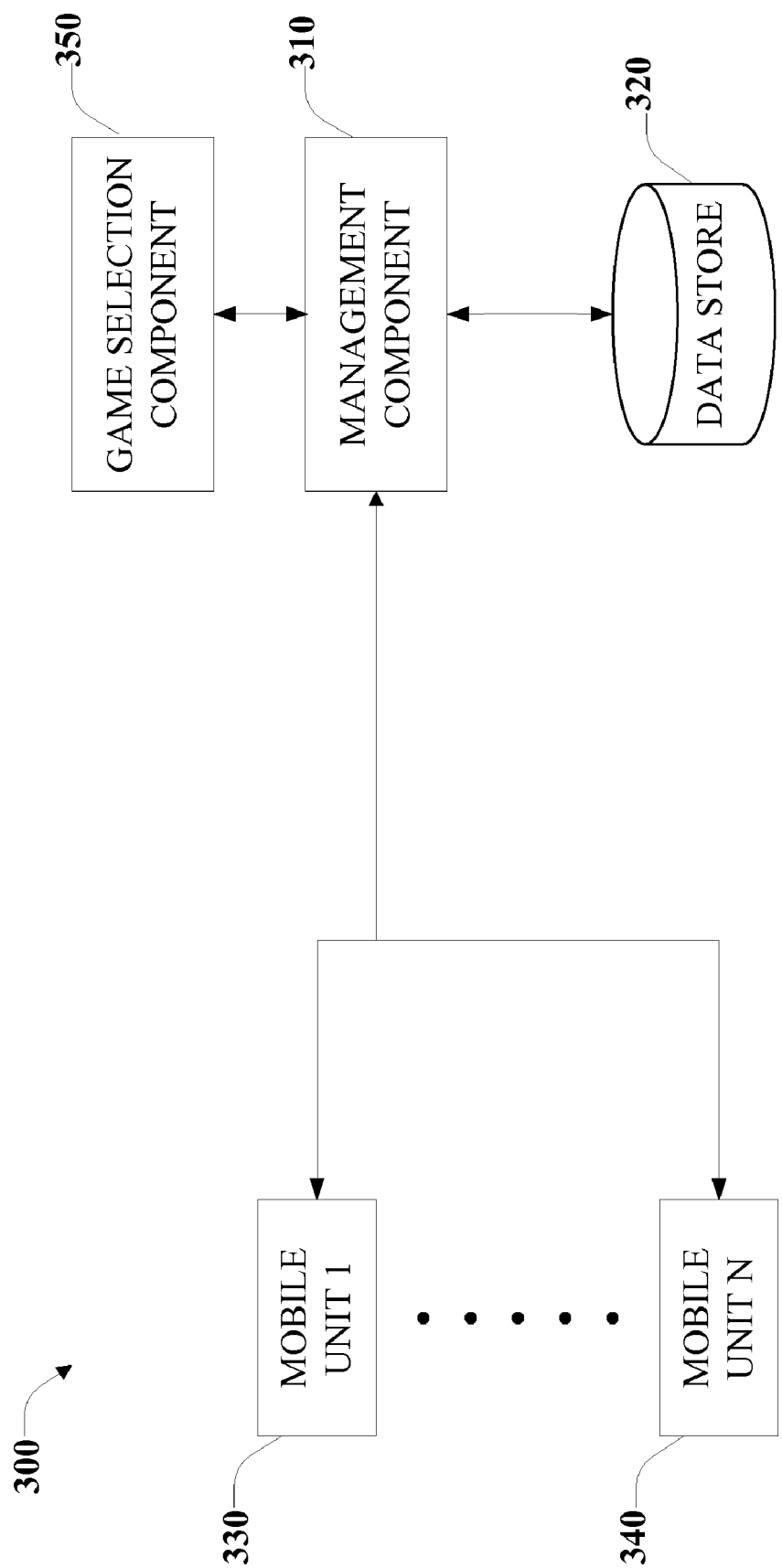
FIG. 3 illustrates an example system that facilitates a MMOG with game selection features in accordance with an aspect of the subject innovation.

FIG. 3 illustrates an example system that facilitates a MMOG in accordance with a third aspect of the subject innovation. Management component 310, data store 320, and mobile units 330 and 340 can perform similar functions to and interact with each other in a manner analogous to components 110-140 of system 100. In addition, game selection component 350 can allow selection between different MMOGs, such as those discussed above. Game selection component 350 can provide these one or more MMOGs to management component 310, and also can provide options associated with the one or more MMOGs to management component 310. A user associated with one of mobile units 330 or 340 can interact with management component 310 to select a game and one or more associated options based at least on the user's preferences. Each user is thus able to customize their game play experience, based on preferences such as the type of game they want to play, other users they desire to play or not play with, etc.

In one or more embodiments, different instances of the same game can be created or organized by management component 310, where a first group of users associated with one or more of mobile units 330 and 340 plays a first instance of the game and a second group of users associated with one or more of mobile units 330 and 340 plays a second instance of the same game, possibly in the same geographic area as the first group, without necessarily interacting with the first group. These different instances can be based on different interests of users, different options available, etc. As illustrative examples, a first group of users who are friends can play a game of tag just among themselves while a second group of users can play a different game of tag in a team-based version of the game.

Figure 4:
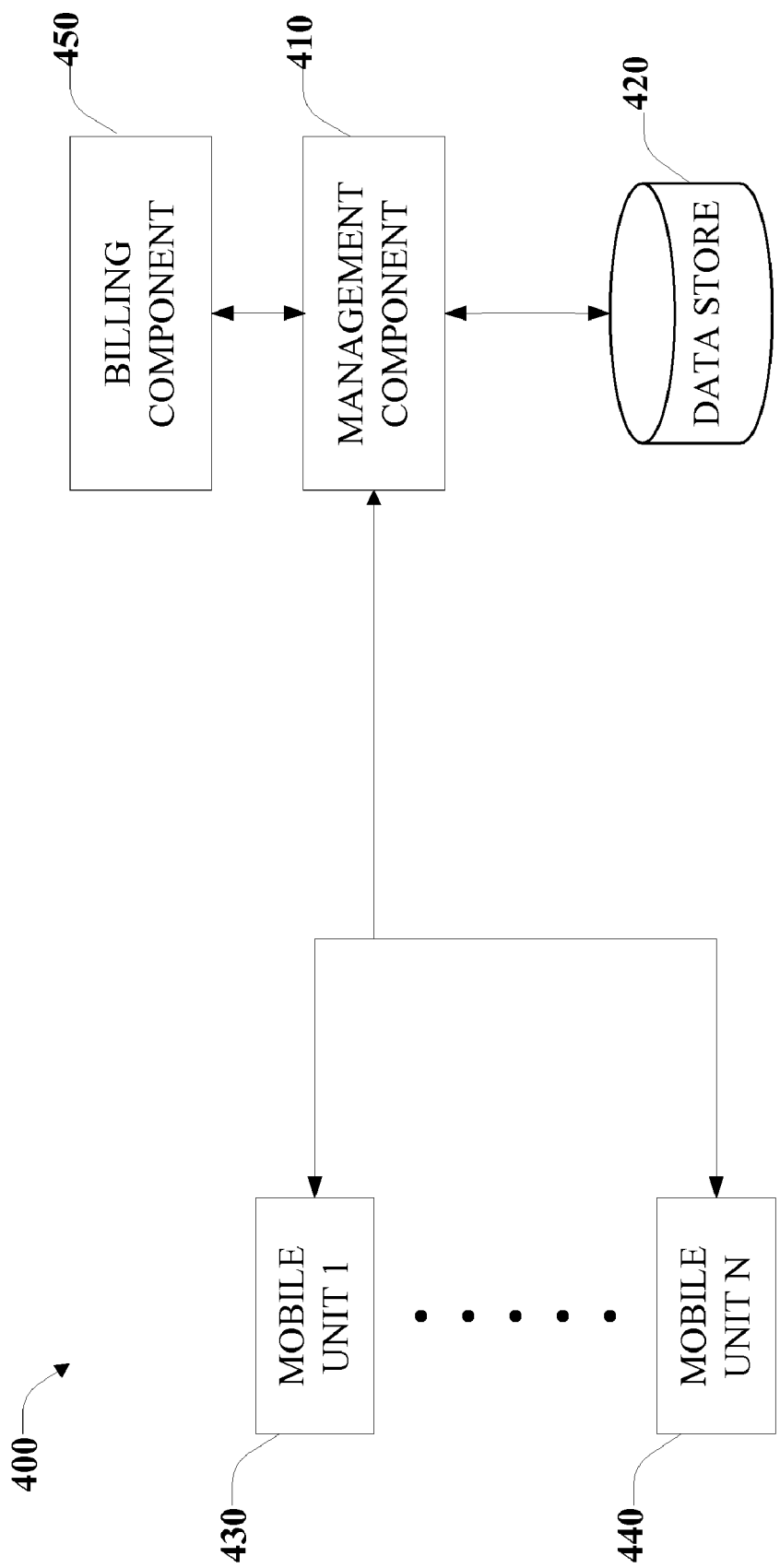
FIG. 4 illustrates an example system that facilitates a MMOG with billing features in accordance with aspects described herein.

Turning to figure FIG. 4, illustrated is an example system 400 that facilitates a MMOG in accordance with another aspect of the subject innovation. In addition to components 410-440 analogous to those already discussed, system 400 comprises billing component 450, which can provide a variety of billing options for user participation in system 400. Billing component 450 can communicate these options to management component 410, which can subject such options to users via mobile units 430 and 440. User billing information can be maintained in data store 420. As examples of the billing options, users can subscribe with a one-time flat rate, purchase a subscription that is valid for a fixed predetermined amount of time or number of engagements, pay based on number of sessions or amount of time played, etc. Further, billing options can vary based on predetermined conditions such as promotional campaigns, e.g., seasonal promotional campaigns, campaigns based on new game releases, etc.

In addition, the service could be offered free of charge or at a reduced cost to users for a trial period or limited number of game sessions, or by providing those users with advertising content. For example, a subscriber can select to receive advertising content which can be provided to the user based on associations between the advertising content and interests or other information associated with the user as described infra. This advertising content can be provided to the user through mobile device 430 or 440, and the presentation can be triggered based on a variety of conditions, e.g., selecting a game, joining a game, leaving a game, at predetermined fixed intervals, based on in-game occurrences such as achieving a predetermined fixed score, proximity to locations, etc.

Figure 5:
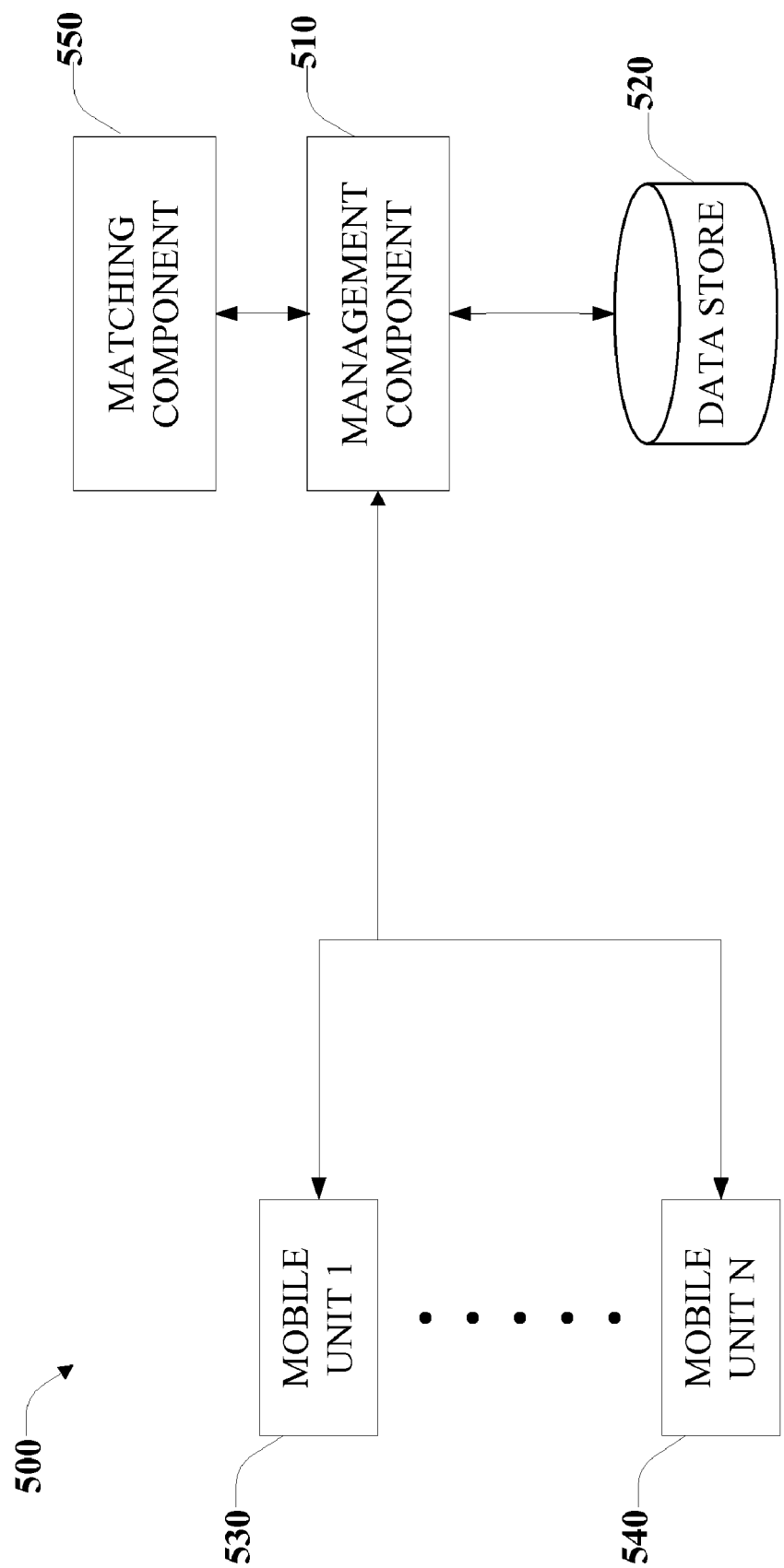
FIG. 5 illustrates an example system that facilitates a MMOG with matching features in accordance with additional aspects of the subject innovation.

FIG. 5 depicts a system 500 of facilitating a MMOG in accordance with an additional aspect of the subject innovation. Components 510-540 can perform analogously to components 110-140 in system 100. Further, matching component 550 can associate users into groups. The groups can be based on similarities or interests among the associated users. In one or more embodiments, these similarities or interests can be provided by subscribers in response to queries communicated from management component 510 to mobile units 530 and 540 (e.g., during a registration process). In other embodiments, similarities or interests can be inferred based on subscriber interactions with system 500 and with other subscribers associated with system 500. Further, factors used for targeting advertising as discussed below can be used as a basis for determining similarities or interests. Data store 520 can store information associated with subscriber similarities or interests, or with interactions and other information relevant to inferring similarities or interests. Groups formed based on these similarities or interests can be used to associate users with games or game instances as discussed above. Information based on these similarities or interests could be provided to users, for example system 500 could let a first user know that a second user is a member of the same outdoor club or that a third user plays the same online game. Privacy settings could be provided to allow players to set how much information about themselves can be shared with other users. Such information can facilitate user socialization and interaction by establishing common ground between users independent of whether users know each other.

Figure 6:
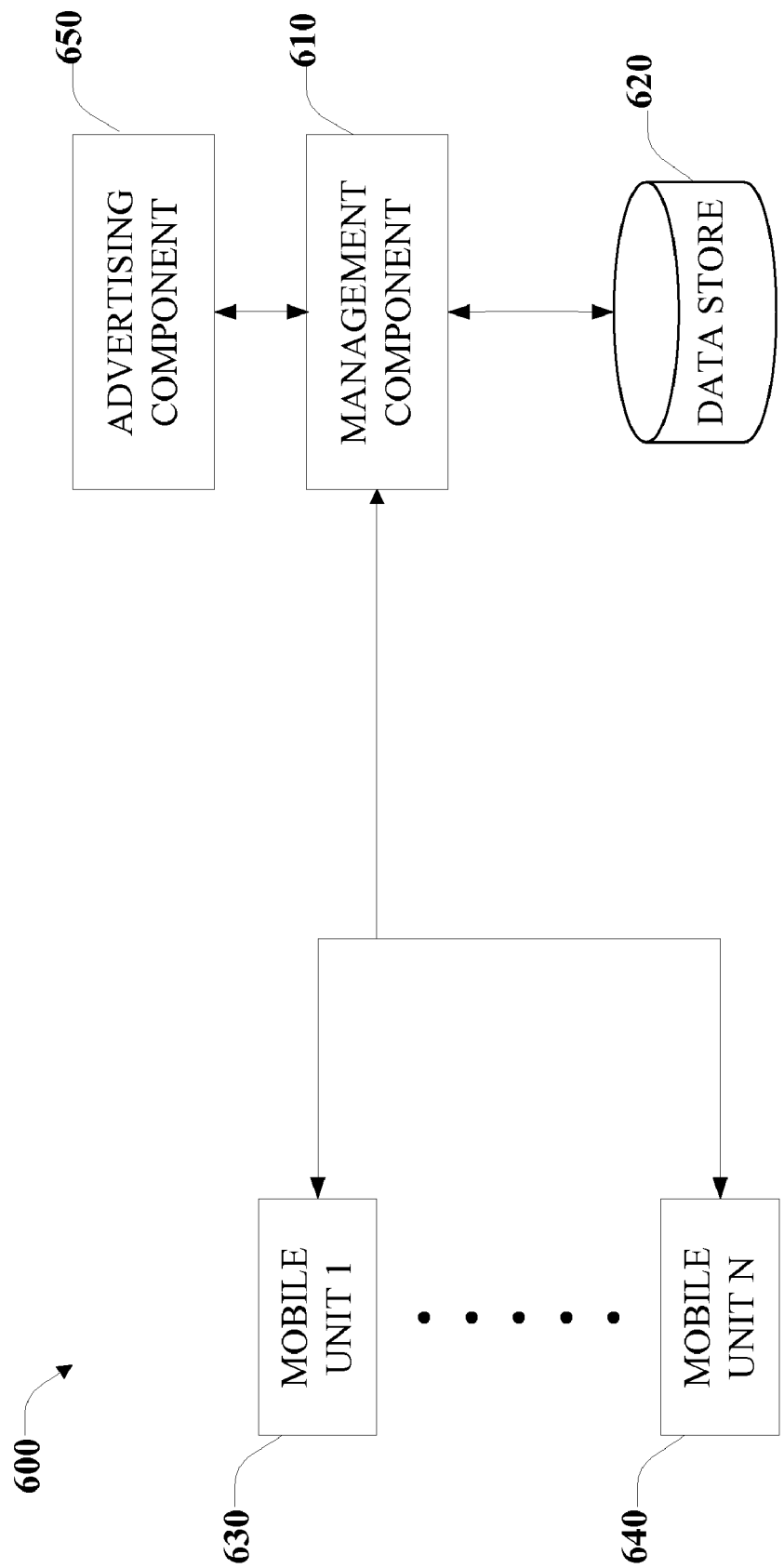
FIG. 6 illustrates a system of facilitating a MMOG with advertising features in conjunction with advertising content in accordance with an aspect of the subject innovation.

Turning to FIG. 6, an example system 600 of facilitating a MMOG in conjunction with advertising content in accordance with an aspect of the subject innovation is illustrated. In addition to aspects of components 610-640 analogous to those discussed above, advertising component 650 can optionally provide advertising content to either or both of mobile units 630 and 640. This advertising content can be obtained from multiple sources. For example, entities wishing to advertise to subscribers could purchase advertising access via an advertising store (not shown) communicatively coupled to system 600. In another example, an advertiser can provide information about one or more products or services offered (e.g., music, clothing, investment services, other online games, etc.). The advertising content can be targeted to users based on a variety of factors. Illustrative example factors are the following. (i) Current or past location information of a mobile unit can be used to select advertising of products and services that correspond with those locations or interests of persons in those areas. (ii) Consumer interests can provide another basis on which to provide advertising content, both in terms of user-specified interests (e.g., consumer surveys, questions associated with a registration process, etc.), as well as interests associated with organizations or activities a user participates in. (ii) A user's association(s) with other users can be exploited to expose the user to advertising; namely, advertisement can be delivered based at least in part on the interests of disparate users the user interacts with. Any of the above illustrative bases for providing advertising content can be combined with each other or with additional criteria (e.g., similarities or interests as discussed above, consumer demographic information such as age or gender, etc.) to provide advertising tailored to a particular user.

Figure 7:
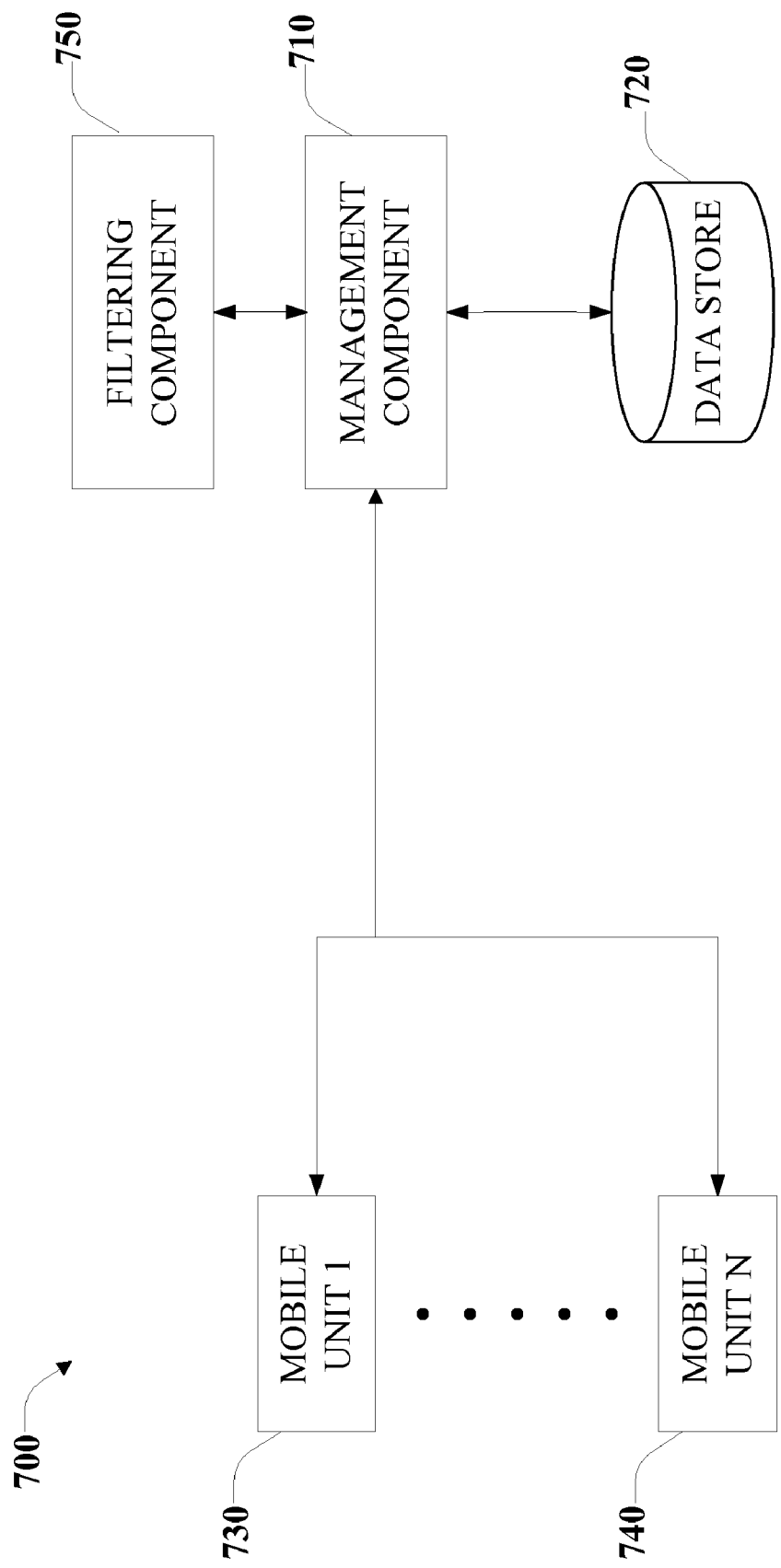
FIG. 7 illustrates a system that facilitates a MMOG with filtering features in accordance with a further aspect of the subject innovation.

FIG. 7 illustrates an example system 700 that facilitates a MMOG in accordance with a further aspect of the subject innovation. Components 710-740 can Filtering component 750 can filter out certain information (e.g., unnecessary or unwanted information) from being communicated to mobile units 730 and 740. In one example, subscribers and information associated with locations, objects, etc. that are more than a certain distance from a player might not be of interest to that player and need not be presented to that player. Also, a player could specify persons, interests, locations, etc., which the player does or does not prefer to provide with information about or interact with in the MMOG. For example, in an embodiment associated with online dating, subscribers Alice, Bob, and Carl might specify preferences such that information associated with Bob and Carl is presented to Alice (and vice versa), but Bob and Carl are not presented with information associated with one another.

Although the above descriptions of FIGS. 1 through 7 have been of separate systems, it is to be understood that the components are modular and can be combined in manners not explicitly disclosed above. For example, two or more of social networking component 250, game selection component 350, billing component 450, matching component 550, advertising component 650, or filtering component 750 can be incorporated into the same system.

Figure 8:
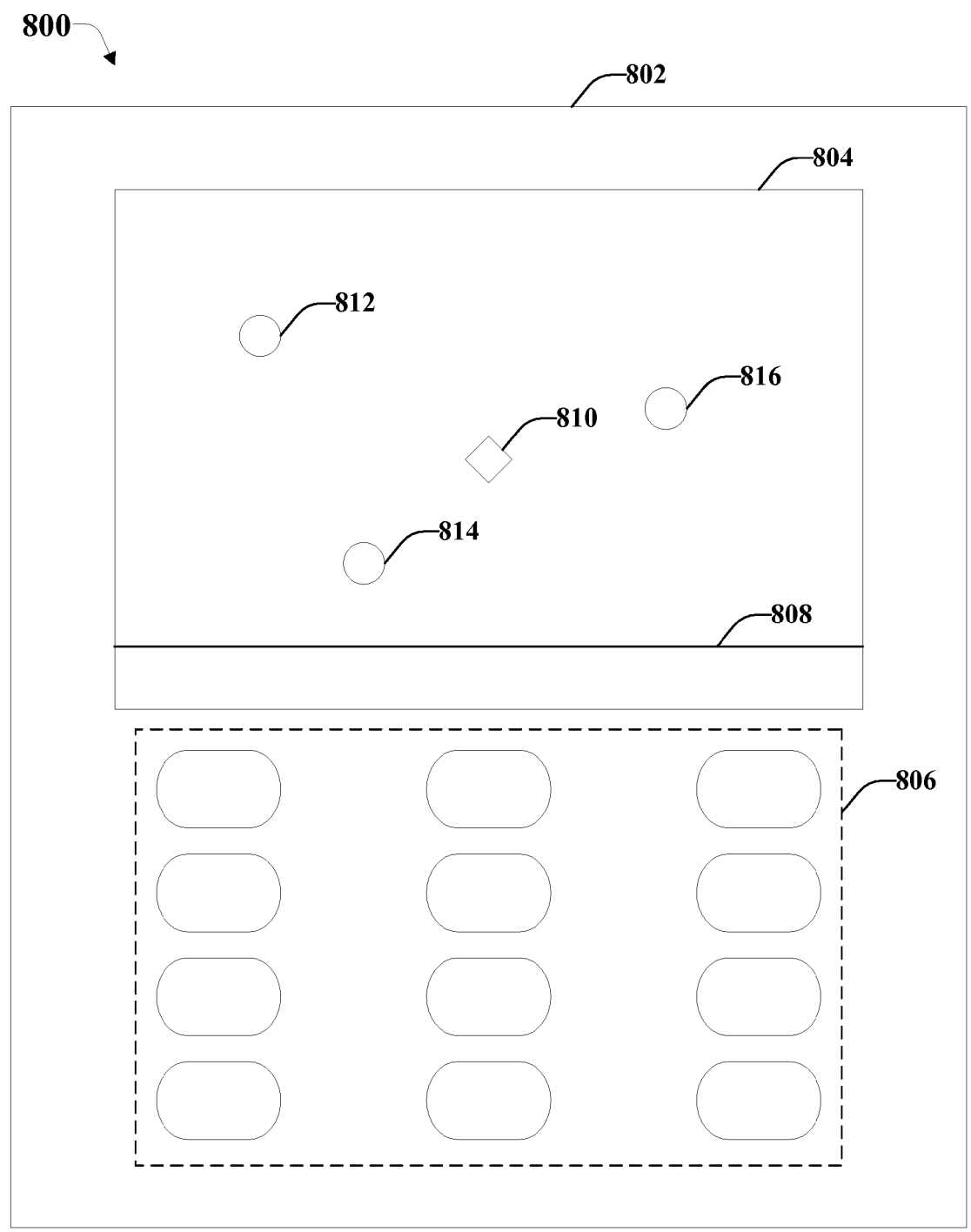
FIG. 8 illustrates an example user interface in accordance with the subject innovation.

Turning to FIG. 8, there is illustrated an example user interface 800 in accordance with the subject innovation. A mobile unit 802 allows a user to interact with a MMOG. One or more displays 804 can be used to graphically present information (e.g. information associated with the subscriber such as an alias or score, group affiliations, feedback from other subscribers, messages provided by an entity managing the MMOG, communications from subscribers, information associated with an object or location, etc.) related to the MMOG. Keypad 806 can provide for user input associated with the MMOG, as can other input interfaces (e.g., via touchscreen, voice commands, Bluetooth, etc.). Display(s) 804 can render an icon 810 representing the mobile user employing user interface 800, as well as icons 812, 814, and 816 representing other users. Although for the purposes of illustration icon 810 is depicted near the center of the display, the display could be panned or zoomed so as to adjust what is displayed, thus allowing a player to view desired information whether or not it is near that player, e.g., the location of a friend. Searching features can be employed in conjunction with the pan and zoom features discussed to allow more efficient user interactions. In addition, information can be coordinated with mapping applications available either on mobile unit 802 or on a network accessible via mobile unit 802 such that data related to streets, locations of interest, etc., are also presented on display 804. A messaging area 808 can be designated as part of display 804 in order to provide some messages and information associated with the MMOG. Additional information can be displayed in other portions of the screen, e.g. labels associated with users or locations depicted on the display.

In view of the example systems described above, example methodologies that can be implemented in accordance with the disclosed subject matter can be better appreciated with reference to flowcharts in FIGS. 9-14. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, it should be understood and appreciated that a methodology could alternatively be represented as a series of inter-related states or events, such as in a state diagram or call flow. In addition, two or more methodologies can be combined to generate a disparate methodology. Moreover, not all illustrated acts may be required to implement a methodology in accordance with the innovation.

Figure 9:
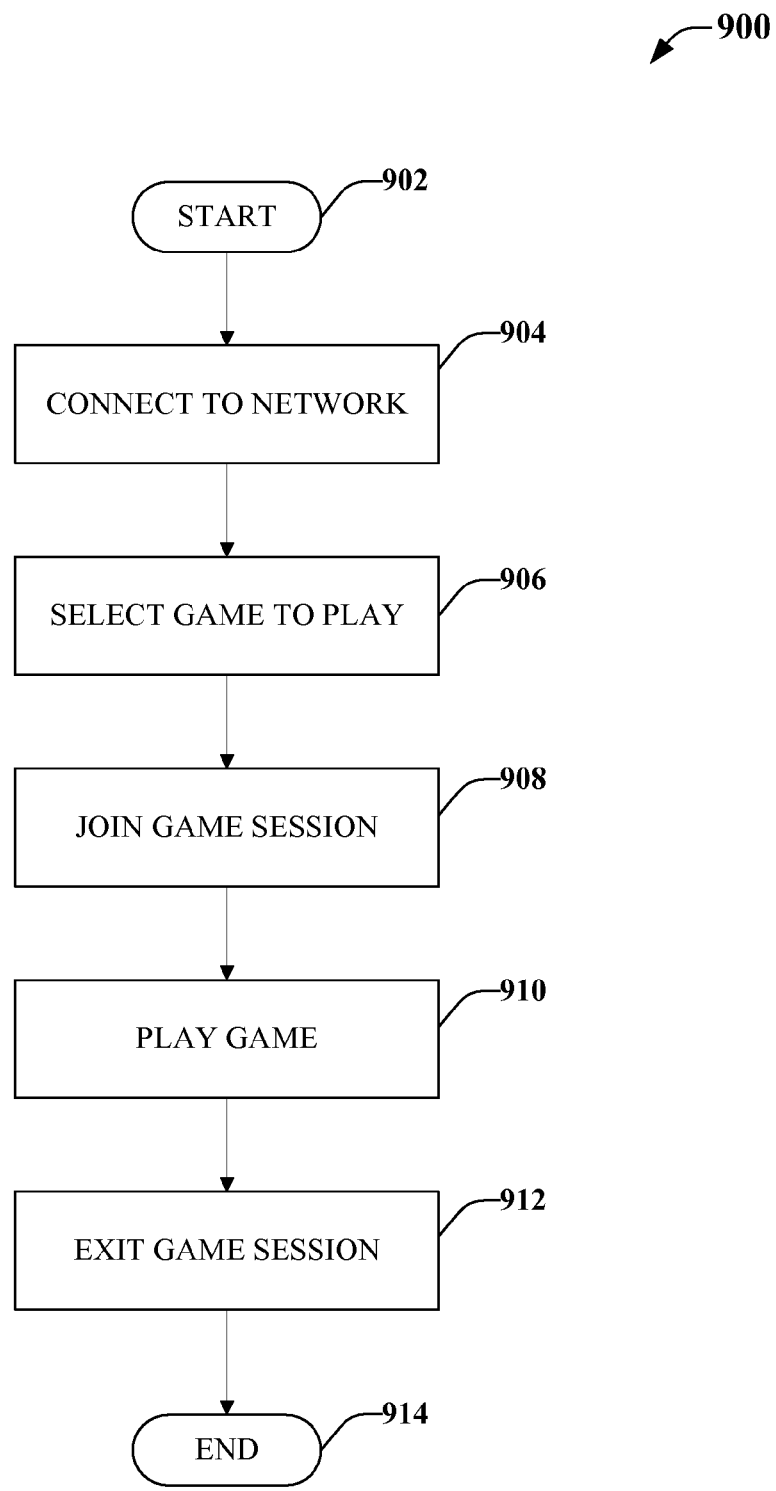
FIG. 9 illustrates an example method of user interaction with a MMOG in accordance with an aspect of the innovation.

FIG. 9 illustrates an example method of user interaction with a MMOG in accordance with an aspect of the subject innovation. At 902, the method begins. The user connects to the network at 904, which can be accomplished in multiple ways, e.g. via cellular communications, WiFi, Bluetooth, etc. At 906, the user can select which game to play. The game selection can involve a choice of the type of game (e.g., tag, capture the flag, etc.) and/or a choice among a particular game session or options (e.g., rules associated with the game, subscribers a user is willing or interested in playing in the MMOG with, etc.) associated with the game. Based on user choices, the user joins the selected game session at 908, and begins playing at 910. The nature of the game play will vary depending on the particular embodiment of the innovation. Game play continues until the user leaves the game at 912 and the method ends at 914.

Figure 10:
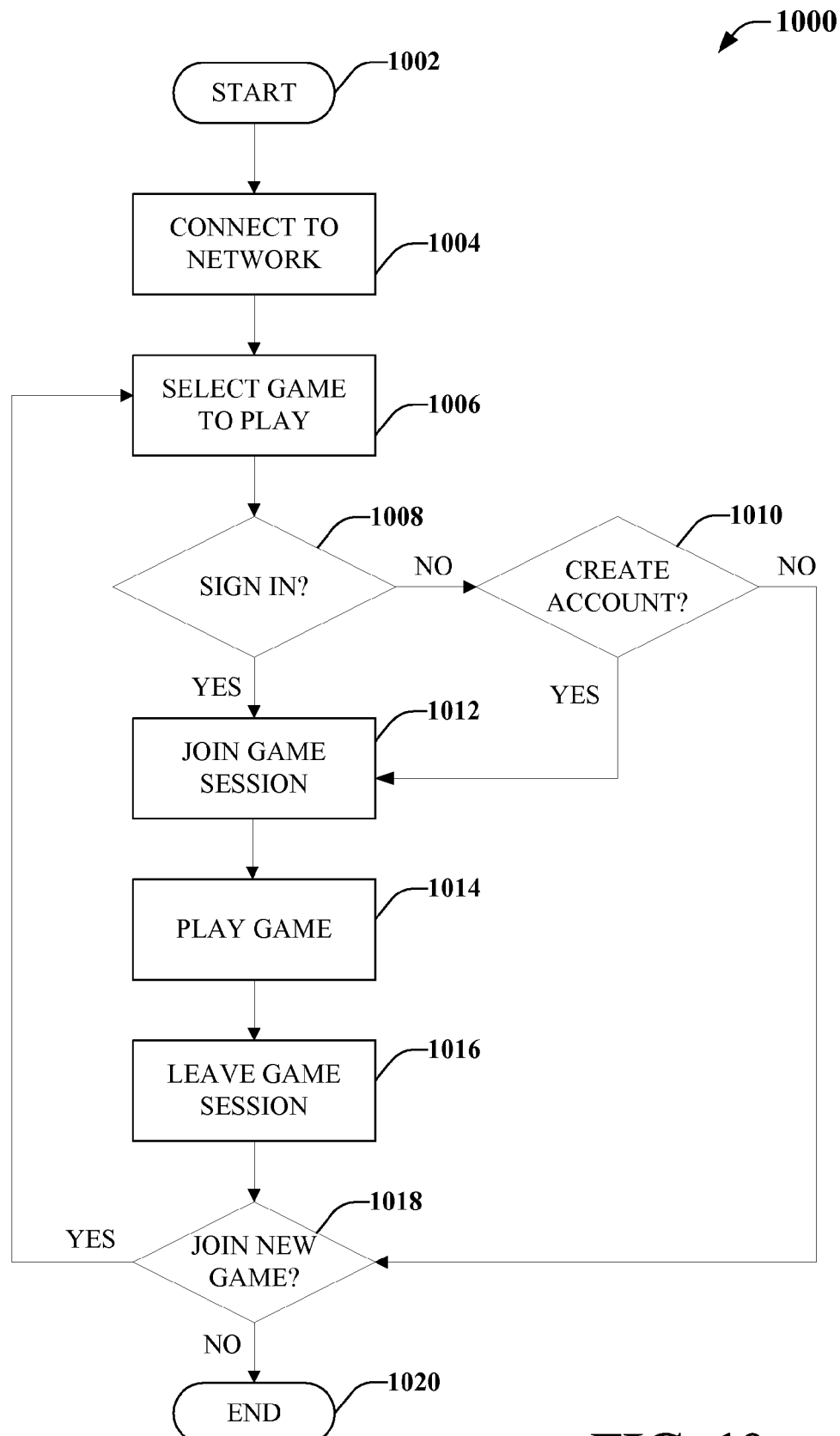
FIG. 10 illustrates an example method of user interaction with a MMOG with game selection features in accordance with an aspect of the innovation.

FIG. 10 illustrates an example method 1000 of user game selection and play with a MMOG in accordance with an aspect of the innovation. The method begins at 1002 and the user connects to the network at 1004 via a mobile unit. At 1006, the user can select a game to play and is prompted to sign in to an account associated with that game and the user at 1008. If the user does not sign in to an account, then the user is given the option of creating an account at 1010. The user can select payment options or choose to receive advertising along with the content. If the user does not create an account, the method can proceed to 1018, where the user can choose to join a new game and return to 1006, or not join a new game and end the method at 1020.

If the user signed in at 1008 or created an account at 1010, then the method proceeds to 1012, where the user joins the selected game session. Game play begins at 1014, continuing until the user leaves the game session at 1016. Upon leaving the game session, the user can have the option of joining a new game at 1018. These options can be presented along with information related to other available games. These games can be selected based on similarities with the game just played, interests of the user, interests of subscribers who share similarities with the user, etc. If the user desires to select a new game, the method returns to 1006; otherwise the method ends at 1020.

Figure 11:
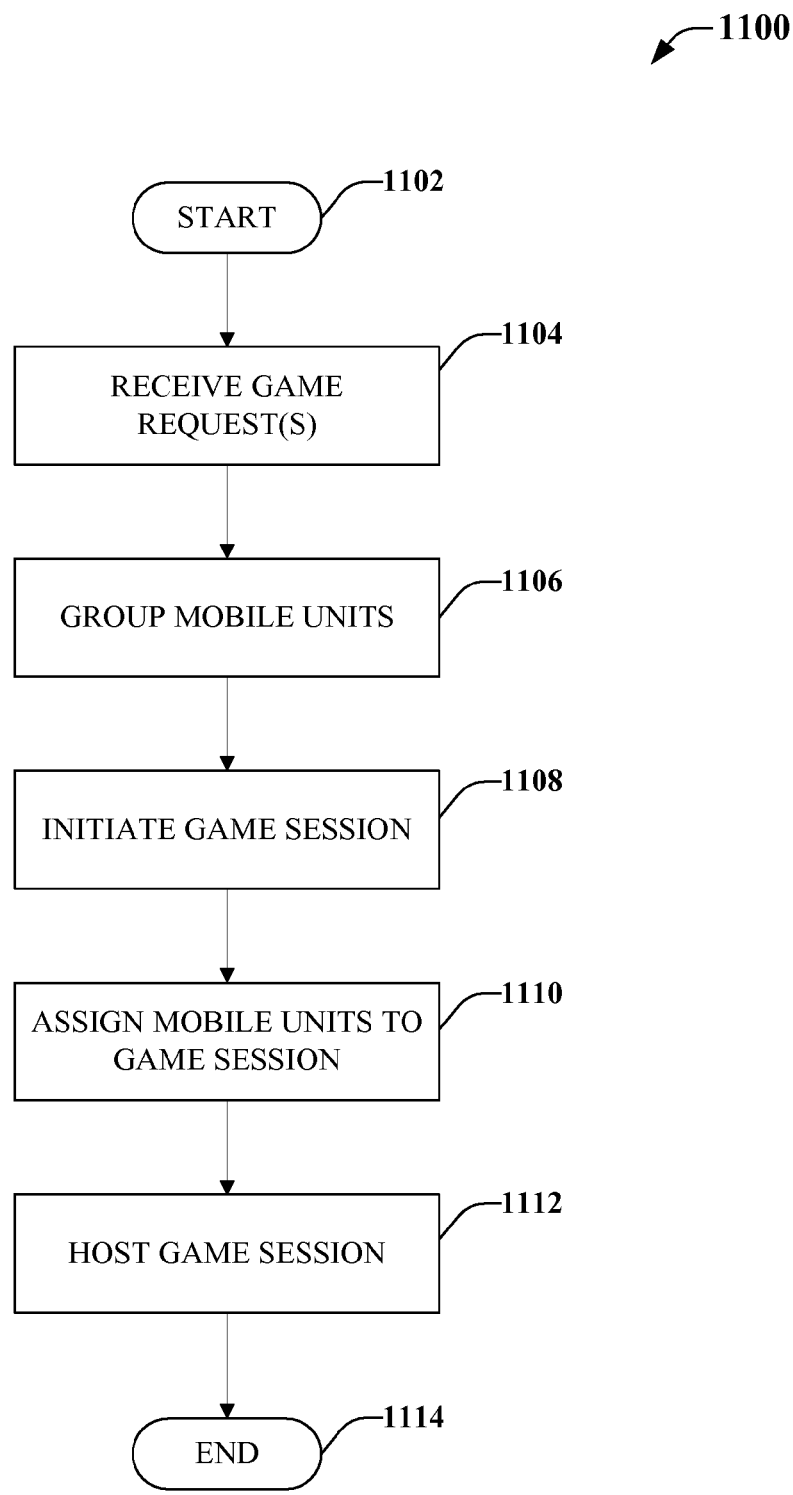
FIG. 11 illustrates an example method for organizing a MMOG in accordance with an aspect of the innovation.

Turning to FIG. 11, illustrated is an example method 1100 of organizing a MMOG in accordance with an aspect of the innovation. The method begins at 1102 and proceeds to 1104 where user requests to participate in games are received. At 1106, mobile units are grouped together into one or more groups based on a variety of factors, e.g. the game or games requested, the user preferences and interests, etc. A game session is initiated at 1108, and associated with a group of mobile units which are assigned to the game session at 1110. Then at 1112, the game session is hosted and users participate in the game until the method ends at 11 14.

Figure 12:
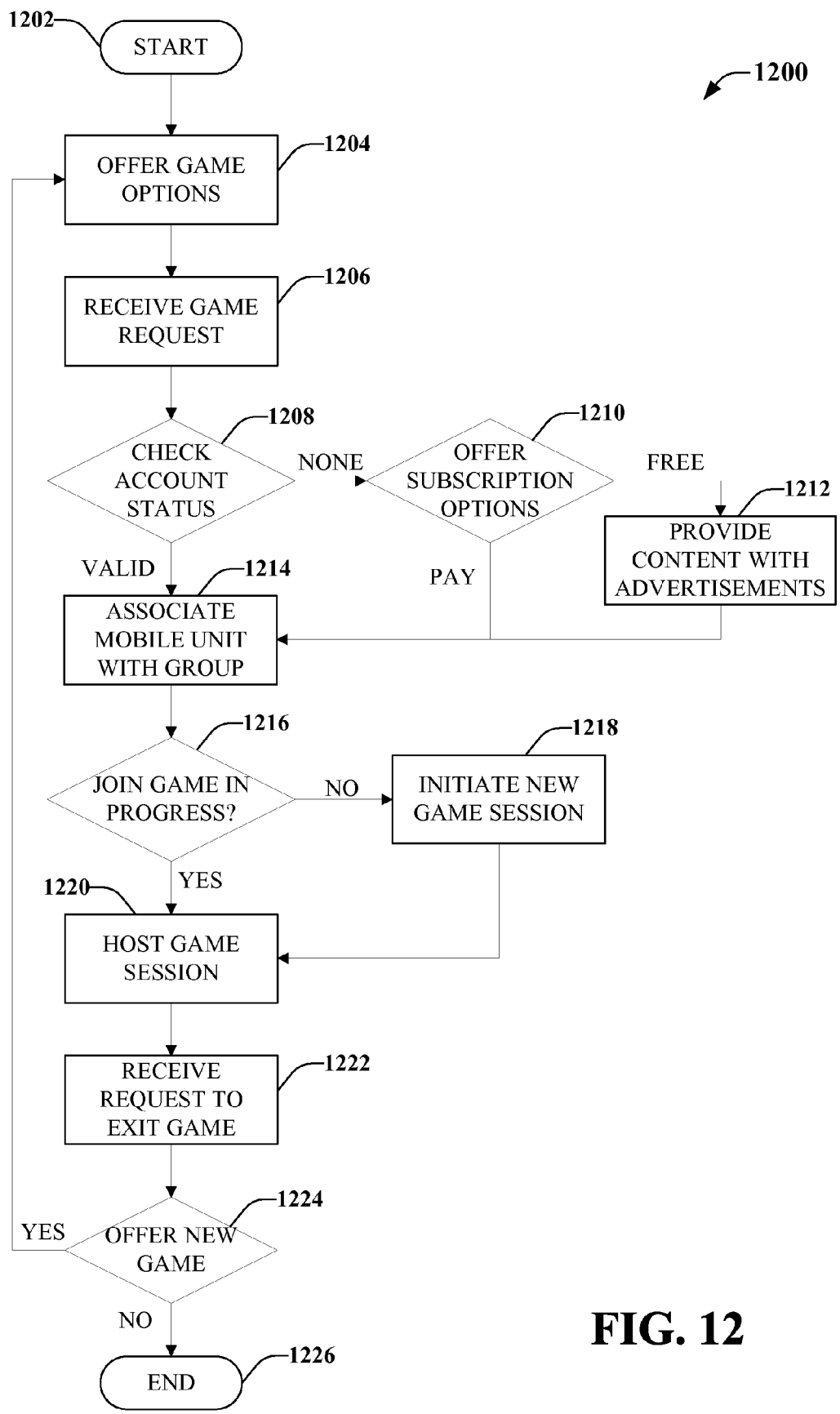
FIG. 12 illustrates an alternative, or additional, example method for organizing a MMOG with user account features in accordance with an aspect of the innovation.

FIG. 12 illustrates an alternative, or additional, example method 1200 of organizing a MMOG in accordance with an aspect of the innovation. The method begins at 1202, and proceeds to 1204, where a mobile user is offered game options, e.g. choices of type of game, game sessions, etc. The mobile user's game request is received at 1206. The account status of the mobile user is verified at 1208. If the user does not have a valid account, subscription options are offered to the user at 1210. The user can select a free subscription and receive advertisements with game content at 1212, or choose other billing options.

After subscription options are selected, or if the account status was valid at 1208, the method then continues at 1214, where the user's mobile unit is associated with a group of other mobile units. This association can be based on a variety of factors, e.g. the game request received at 1206, account options, etc.

The method continues at 1216, where a determination is made whether to place the mobile user in a game already in progress. This decision can be based at least upon multiple factors, e.g. whether other mobile users associated with the user are already in game sessions, the number of users in game sessions, etc. If necessary, a new game session can be initiated at 1218 before proceeding to host the game session at 1220. In addition to providing content to mobile units associated with the game at 1220, content associated with the MMOG can be provided to other entities, such as a web portal as discussed above. This can provide users not playing the MMOG opportunities to communicate with players, monitor the progress of the MMOG, determine statistics associated with the game (score, number of current players, location of players, etc.), and so forth. Game play proceeds until a request to exit the game is received at 1222. At 1224, the user can choose whether to participate in a new game, in which case the method returns to 1204; otherwise the method ends at 1226.

Figure 13:
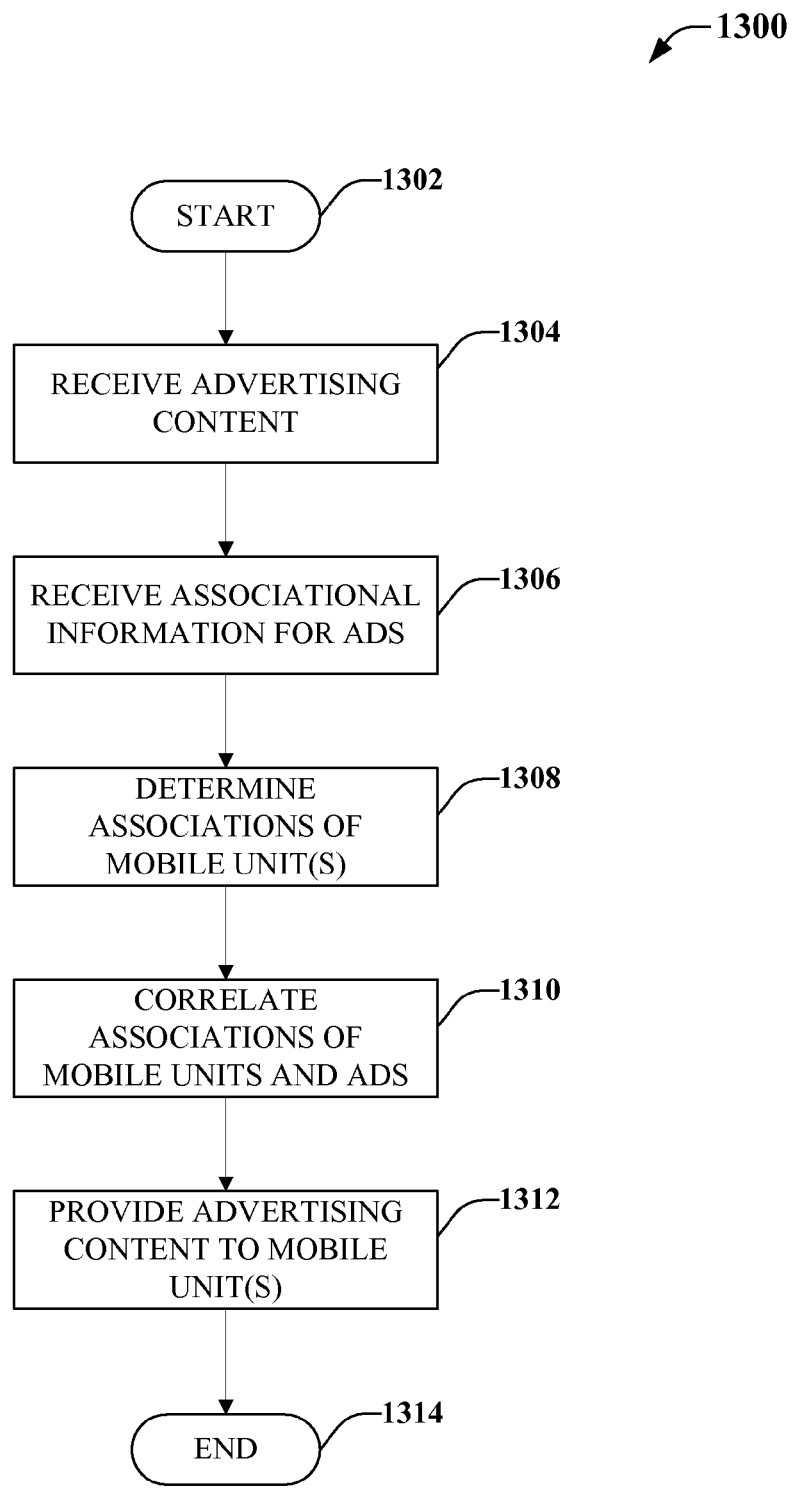
FIG. 13 illustrates an example method for providing advertising content associated with a MMOG in accordance with an aspect of the subject innovation.

Referring to FIG. 13, there is illustrated a methodology 1300 of providing advertising content associated with a MMOG in accordance with an aspect of the innovation. The method begins at 1302 and proceeds to 1304 where advertising content to be provided to users is received. Associational information related to the advertisements can be received at 1306, such as targeted demographics, customer interests, demographics of customers purchasing related products, etc. At 1308, associations are determined for mobile units of the users, such as user interests, organizations, activities, associations of friends and other closely related users, etc. The associational information related to the advertisements and mobile units is correlated at 1310 to determine which advertising content to provide to the mobile units. At 1312, the selected advertisement(s) are provided, and the method ends at 1314.

Figure 14:
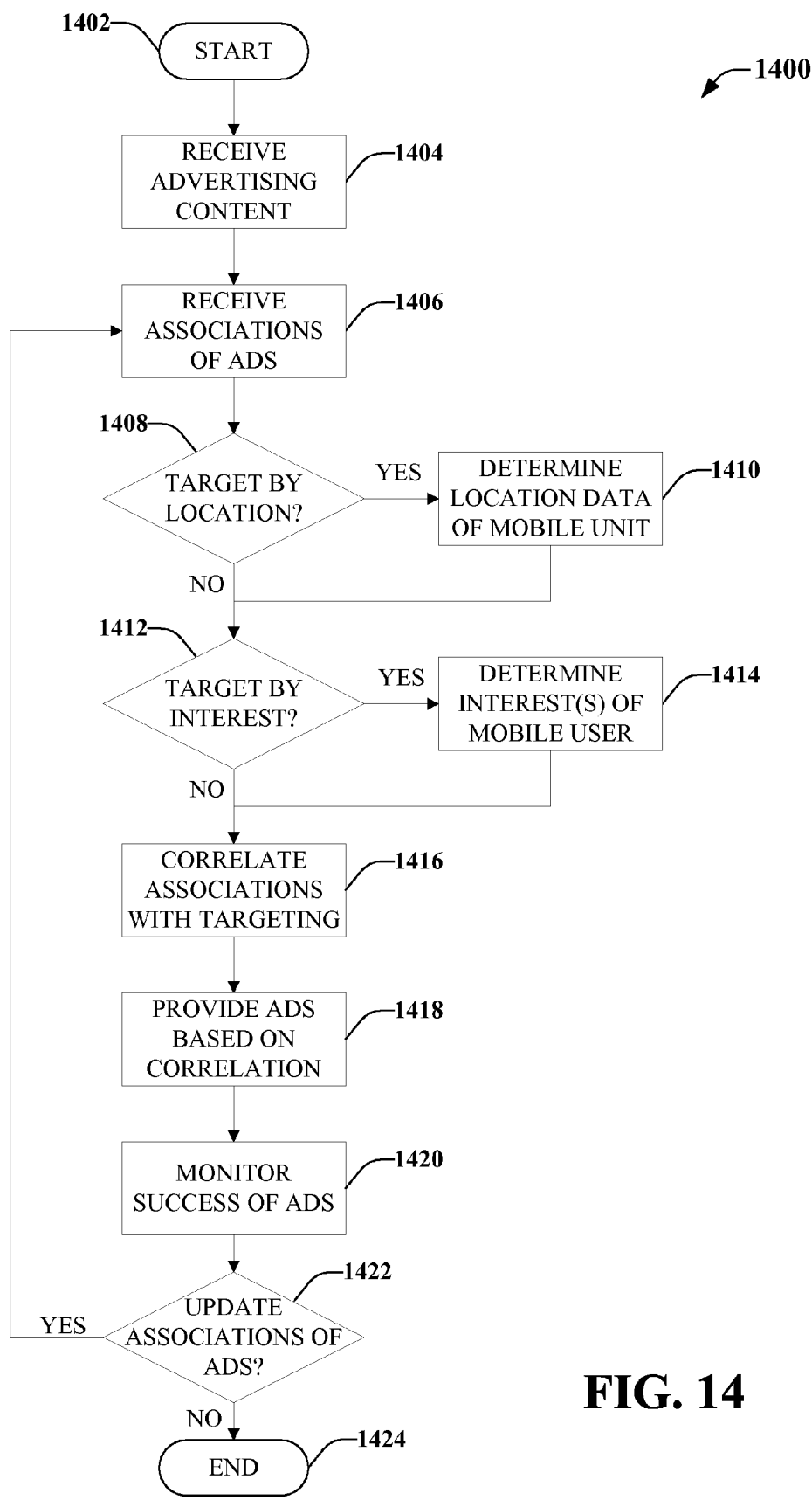
FIG. 14 illustrates an additional example method for providing advertising content associated with a MMOG that facilitates targeted advertising in accordance with an aspect of the subject innovation.

FIG. 14 illustrates a second methodology 1400 of providing advertising content associated with a MMOG in accordance with an aspect of the innovation. The method begins at 1402, and advertising content is received at 1404. At 1406, associational information related to the ads is received. Determinations are made as to how to target the advertisements to mobile users. At 1408, a decision is made as to whether advertising should be targeted based on the location of the mobile user. If so, location data related to the mobile user is determined at 1410 before proceeding. A choice of whether to target advertisements based on user interests is made at 1412, and if necessary, interests of the mobile user (e.g. based on information provided by the user, organizations the user participates in, associated users and their interests, etc.) are determined at 1414 before the method continues.

At 1416, associational information of the ads is correlated with mobile user information to target the ads to specific users. These ads are then provided to mobile users based on the correlations at 1418. The success of the ads can be monitored at 1420, based on, e.g., user interaction with ads, purchases, etc. At 1422, a decision is made whether to update the associational information of the ads. This information can either be employed in accordance with the present innovation or provided to the advertisers, or both. If the information is updated, the method returns to 1406; otherwise it ends at 1424.

Figure 15:
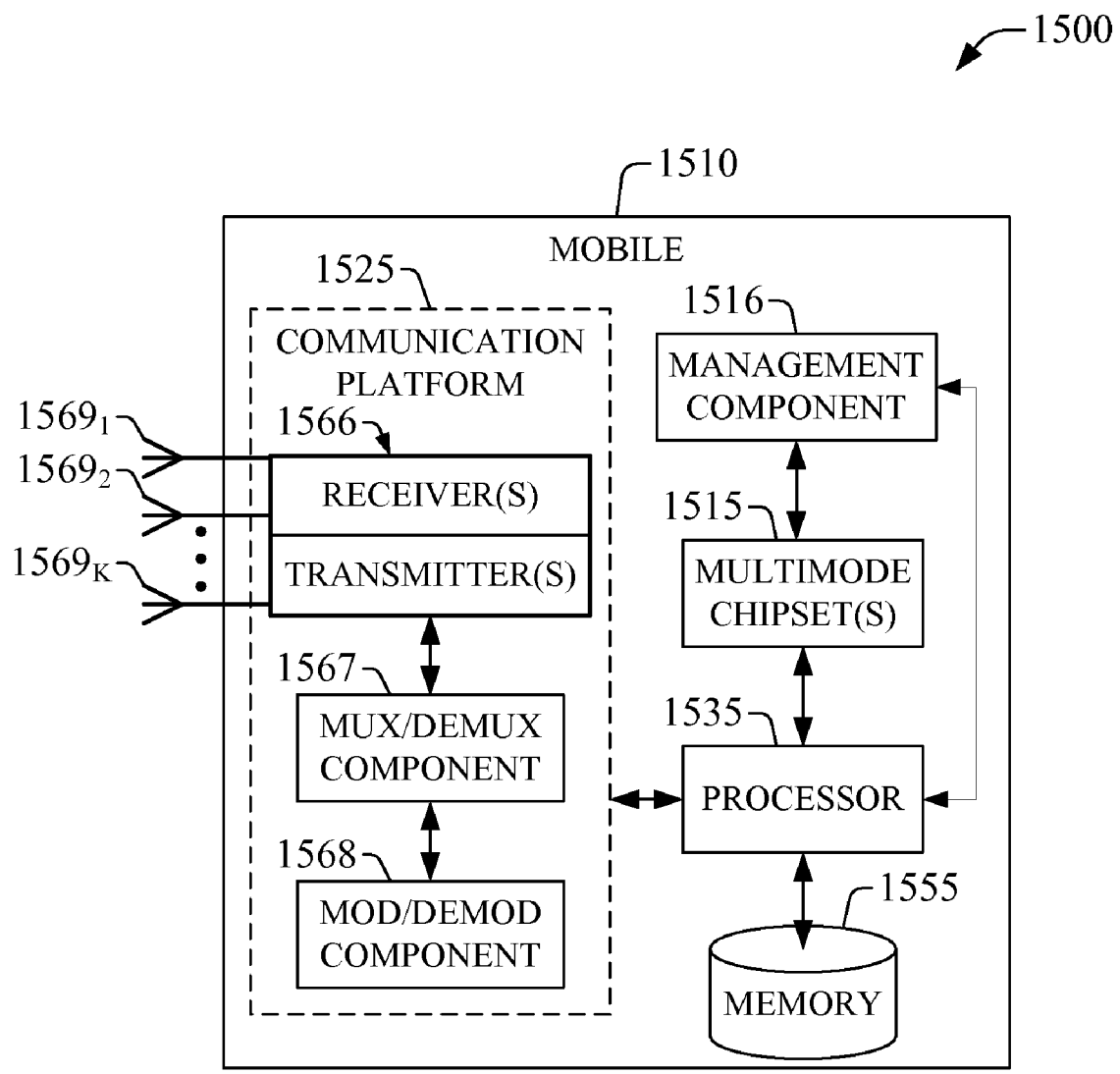
FIG. 15 illustrates a block diagram of an example embodiment of a mobile that can facilitate user interaction with a MMOG in accordance with aspects described herein.
Figure 16:
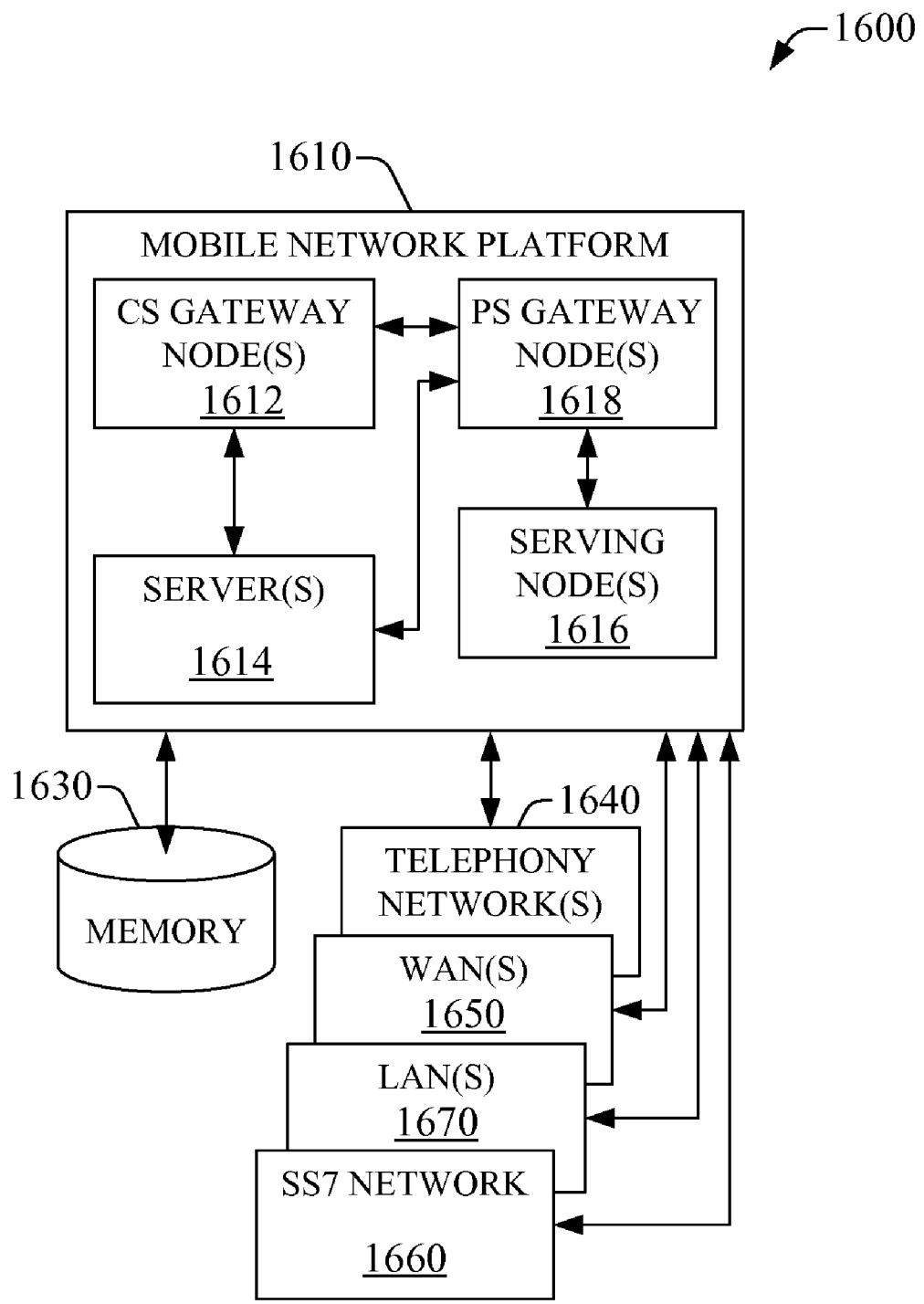
FIG. 16 is a block diagram of an example embodiment of a mobile network platform which can organize and manage a MMOG in accordance with aspects described herein.

To provide further context for various aspects of the subject specification, FIG. 15 illustrates a block diagram of an example embodiment 1500 of a mobile 1510 that can facilitate user interaction with the MMOG systems disclosed above. Additionally, FIG. 16 presents an example embodiment 1600 of a mobile network platform 1610 which can manage the MMOG and communicate with mobile devices in accordance with aspects described herein.

In mobile 1510, which can be a multimode access terminal, a set of antennas $1569_1$-$1569_K$ (K is a positive integer) can receive and transmit signal(s) from and to wireless devices like access points, access terminals, wireless ports and routers, and so forth, that operate in a radio access network (not shown). It should be appreciated that antennas $1569_1$-$1569_K$ are a part of communication platform 1525, which comprises electronic components and associated circuitry that provide for processing and manipulation of received signal(s) and signal(s) to be transmitted. In an aspect, communication platform 1525 includes receiver(s)/transmitter(s) 1566 that can convert signal from analog to digital upon reception, and from digital to analog upon transmission. In addition, receiver/transmitter 1566 can divide a single data stream into multiple, parallel data streams, or perform the reciprocal operation; such operations typically conducted in various multiplexing schemes. Functionally coupled to receiver(s)/transmitter(s) 1566 is a multiplexer/demultiplexer (mux/demux) component 1567 that facilitates manipulation of signal in time and frequency space. Electronic mux/demux component 1567 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1567 can scramble and spread information (e.g., codes) according to substantially any code; e.g., Hadamard-Walsh codes, Baker codes, Kasami codes, polyphase codes, and so on. A modulator/demodulator (mod/demod) component 1568 is also a part of communication platform 1525, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 1500, mod/demod component 1568 is functionally coupled to mux/demux component 1567.

In embodiment 1500, multimode operation chipset(s) 1515 allows mobile 1510 to operate in multiple communication modes in accordance with disparate technical specification for wireless technologies. In an aspect, multimode operation chipset(s) 1515 utilizes communication platform 1525 in accordance with a specific mode of operation. In another aspect, multimode operation chipset(s) 1515 can be scheduled to operate concurrently (e.g., when N >1) in various modes or within a multitask paradigm.

Mobile 1510 also includes a processor 1535 configured to confer functionality, at least in part, to substantially any electronic component within mobile 1510, in accordance with aspects of the subject innovation. As an example, processor 1535 can be configured to execute, at least in part, instructions in multimode operation chipset(s) that afford multimode communication through mobile 1510 like concurrent or multitask operation of two or more chipset(s). Moreover, processor 1535 facilitates mobile 1510 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1555 can store data structures (e.g., metadata); code structure(s) (e.g., modules, objects, classes, procedures) or instructions; network or device information like policies and specifications; code sequences for scrambling, spreading and pilot (e.g., reference signal(s)) transmission; frequency offsets, cell IDs, and so on.

In embodiment 1500, processor 1535 is functionally coupled (e.g., through a memory bus) to memory 1555 in order to store and retrieve information necessary to operate and/or confer functionality, at least in part, to communication platform 1525, multimode operation chipset(s) 1515, and other operational aspects of multimode mobile 1510.

It is to be appreciated that mobile 1510 can embody one or more of mobile unit 1 130 through mobile unit N 140, or analogous components in FIG. 2-FIG. 7. Moreover, embodiment 1500 can comprise user interface 800 of FIG. 8. In one or more peer-to-peer embodiments of the subject innovation is discussed above, embodiment 1500 can comprise a management component 110, data store 120, and analogous components in FIG. 2-FIG. 7. In such aspects, management component 1516 has substantially the same, or the same, functionality as management component 110 and analogous components in other drawings. Additionally, memory 1555 can embody data store 120 and analogous memory elements.

As indicated supra, FIG. 16 presents an example embodiment 1600 of a mobile network platform 1610 which can organize and manage a MMOG, store relevant data, and perform other functions in accordance with aspects described herein. Generally, mobile network platform 1610 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, mobile network platform 1610 includes CS gateway node(s) 1612 which can interface CS traffic received from legacy networks like telephony network(s) 1640 (e.g., public switched telephone network (PSTN), or public land mobile network (PLMN)) or a SS7 network 1660. Circuit switched gateway node(s) 1612 can authorize and authenticate traffic (e.g., voice) arising from such networks. Additionally, CS gateway node(s) 1612 can access mobility, or roaming, data generated through SS7 network 1660; for instance, mobility data stored in a visitation location register (VLR), which can reside in memory 1630. Moreover, CS gateway node(s) 1612 interfaces CS-based traffic and signaling and gateway node(s) 1618. As an example, in a 3GPP UMTS network, CS gateway node(s) 1612 can be embodied, at least in part, in gateway GPRS support node(s) (GGSN).

In the subject innovation, in addition to receiving and processing CS-switched traffic (e.g., certain content(s) that can be associated with the MMOG, such as voice calling content in connection with aspects of the present innovation) and signaling, PS gateway node(s) 1618 can authorize and authenticate PS-based data sessions with served mobile devices (e.g., for transmitting certain content(s) associated with the MMOG, such as messaging or game data). Data sessions can include traffic, or content(s) (e.g., advertising content related to advertising component 650, associational data related to social networking component 250, etc.), exchanged with networks external to the mobile network platform 1610, like wide area network(s) (WANs) 1650; it should be appreciated that local area network(s) (LANs) 1670 can also be interfaced with mobile network platform 1610 through PS gateway node(s) 1618. Packet-switched gateway node(s) 1618 generates packet data contexts when a data session is established. To that end, in an aspect, PS gateway node(s) 1618 can include a tunnel interface (e.g., tunnel termination gateway (TTG) in 3GPP UMTS network(s) (not shown)) which can facilitate packetized communication with disparate wireless network(s), such as Wi-Fi networks. It should be further appreciated that the packetized communication can include multiple flows that can be generated through service (e.g., provisioning) and application server(s) 1614. It is to be noted that in 3GPP UMTS network(s), PS gateway node(s) 1618 (e.g., GGSN) and tunnel interface (e.g., TTG) comprise a packet data gateway (PDG).

In embodiment 1600, mobile network platform 1610 also includes serving node(s) 1616 that convey the various packetized flows of data streams (e.g., content(s) that are part of content transaction(s)), received through PS gateway node(s) 1618. As an example, in a 3GPP UMTS network, serving node(s) 1616 can be embodied in serving GPRS support node(s) (SGSN).

Server(s) 1614 in mobile network platform 1610 can execute numerous applications (e.g., management of the MMOG, coordination of communications between mobile networks, exchanging data with external entities such as advertising providers and social networking sites, . . . ) that can generate multiple disparate packetized data streams or flows, and manage (e.g., schedule, queue, format . . . ) such flows. Such application(s), for example can include add-on features to standard services provided by mobile network platform 1610. Data streams can be conveyed to PS gateway node(s) 1618 for authorization/authentication and initiation of a data session, and to serving node(s) 1616 for communication thereafter. Server(s) 1614 can also effect security (e.g., implement one or more firewalls) of mobile network platform 1610 to ensure network's operation and data integrity in addition to authorization and authentication procedures that CS gateway node(s) 1612 and PS gateway node(s) 1618 can enact. Moreover, server(s) 1614 can provision services from external network(s), e.g., WAN 1650, or Global Positioning System (GPS) network(s) (not shown). It is to be noted that server(s) 1614 can include one or more processor configured to confer at least in part the functionality of macro network platform 1610. To that end, the one or more processor can execute code instructions stored in memory 1630, for example. Server(s) 1614 also can include an advertisement component (not shown) that provides substantially the same functionalities as advertisement component 650. Furthermore, server(s) 1614 can at least in part embody, and provide the functionalities of, management component 110 and analogous components.

In example wireless environment 1600, memory 1630 can store information related to operation of mobile network platform 1610, and in one or more embodiments can comprise data store 120 or analogous components 220, 320, 420, 520, 620, or 720. Information can include provisioning information of devices served directly through the mobile platform network 1610, e.g., location data of the player and other subscribers; accounts of subscribers to one or more MMOGs; social networking data related to subscribers; account billing information, e.g., promotional rates, flat-rate programs, couponing campaigns; technical specification(s) of mobile devices recorded with the mobile network platform (e.g., certain optional features may be enabled on some, but not all, mobile units based on equipment capabilities); and so forth. Memory 1630 can also store information from at least one of telephony network(s) 1640, WAN 1650, LAN 1670, or SS7 network 1660.

Various aspects or features described herein may be implemented as a method, apparatus, or article of manufacture using standard programming and/or engineering techniques. In particular, the aspects or features can be implemented through program modules stored in a memory and executed by a processor, and/or other combination of hardware and software, e.g., firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise game information; player and player account information; files and applications; advertising content; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method, comprising:
  receiving a massively multiplayer online game request from a mobile unit;
  associating the mobile unit with a group of massively multiplayer online gamers included in a set of massively multiplayer online gamer groups;
  assigning the set of massively multiplayer online gamer groups to a game session;
  hosting the game session to facilitate gameplay among the set of massively multiplayer online gamer groups assigned to the game session through a set of mobile units associated with the set of massively multiplayer online gamer groups;

receiving a set of advertisements;

receiving a set of target demographic information related to the set of advertisements;

determining a set of user associations for a user of the mobile unit;

comparing the set of target demographic information to the set of user associations; and providing an advertisement in the set of advertisements to the mobile unit, based at least in part on the comparing.

2. The method of claim 1, further comprising receiving a set of social information associated with a user of the mobile unit, and associating the mobile unit with the group of massively multiplayer online gamers included in the set of massively multiplayer online gamer groups based at least in part on the set of social information.

3. The method of claim 1, further comprising coordinating location data associated with a subset of mobile units in the set of mobile units.

4. The method of claim 1, further comprising providing a set of billing options to the mobile unit.

5. The method of claim 1, further comprising providing content based at least in part on the massively multiplayer online game to the mobile unit via a web portal.

6. The method of claim 1, wherein the providing the advertisement to the mobile unit is based at least in part on a set of location data associated with the mobile unit.

7. The method of claim 1, further comprising monitoring the effectiveness of the advertisement.

8. A non-transitory computer readable storage medium comprising computer executable instructions that, in response to execution, cause a computing system to perform operations, comprising:

receiving a massively multiplayer online game request from a mobile unit;

associating the mobile unit with a group of massively multiplayer online game players included in a set of massively multiplayer online game player groups;

assigning the set of massively multiplayer online game player groups to a game session;

hosting the game session through a set of mobile units associated with the set of massively multiplayer online game player groups including enabling a set of mobile users associated with the set of massively multiplayer online game player groups to interact in the game session;

receiving a set of advertisements;

receiving a set of target geographical information related to the set of advertisements;

determining a set of user associations for a user of the mobile unit;

correlating the set of target geographical information to the set of user associations; and providing an advertisement in the set of advertisements to the mobile unit, based at least in part on the correlating.

9. The non-transitory computer readable storage medium of claim 8, further comprising coordinating location data associated with a subset of mobile units in the set of mobile units.

10. The non-transitory computer readable storage medium of claim 8, further comprising providing a set of billing options to the mobile unit.

11. The non-transitory computer readable storage medium of claim 8, further comprising providing content based at least in part on the massively multiplayer online game to the mobile unit via a web portal.

12. The non-transitory computer readable storage medium of claim 8, further comprising receiving a set of social information associated with the user.

13. The non-transitory computer readable storage medium of claim 12, wherein the determining the set of user associations is based at least in part on the set of social information.

14. The non-transitory computer readable storage medium of claim 8, further comprising monitoring an effectiveness of the advertisement.

15. A device, comprising:

a memory that retains a set of program modules; and a processing unit that executes the set of program modules, and in response to the execution, causes the device to:

receive a massively multiplayer online game request from a mobile unit;

assign the mobile unit to a group of game players;

assign the group of game players to a game session; and host the game session to facilitate game play among a set of game player groups assigned to the game session through a set of mobile units included in the game session;

receive a set of advertisements;

receive a set of target demographic information related to the set of advertisements;

determine a set of user associations for a user of the mobile unit based at least in part on a set of social data associated with the user of the mobile unit; and provide an advertisement in the set of advertisements to the mobile unit based at least in part on a comparison of the set of target demographic information to the set of user associations.

16. The device of claim 15, wherein the processing unit further causes the device to coordinate a set of location data associated with a subset of mobile units in the set of mobile units.

* * * * *